(12) United States Patent
Kinagi

(10) Patent No.: US 11,943,231 B2
(45) Date of Patent: *Mar. 26, 2024

(54) TOKEN AND CRYPTOGRAM USING TRANSACTION SPECIFIC INFORMATION

(71) Applicant: Visa International Service Association, San Francisco, CA (US)

(72) Inventor: Veeresh Kinagi, Redmond, WA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 157 days.

This patent is subject to a terminal disclaimer.

(21) Appl. No.: 17/349,727

(22) Filed: Jun. 16, 2021

(65) Prior Publication Data

US 2021/0312448 A1 Oct. 7, 2021

Related U.S. Application Data

(63) Continuation of application No. 15/540,759, filed as application No. PCT/US2016/018267 on Feb. 17, 2016, now Pat. No. 11,068,895.

(Continued)

(51) Int. Cl.
*H04L 9/32* (2006.01)
*G06Q 20/32* (2012.01)
(Continued)

(52) U.S. Cl.
CPC ....... *H04L 63/107* (2013.01); *G06Q 20/3224* (2013.01); *G06Q 20/385* (2013.01);
(Continued)

(58) Field of Classification Search
CPC ............ G06Q 20/4015; G06Q 20/223; G06Q 20/3224; G06Q 20/385; H04W 4/029;
(Continued)

(56) References Cited

U.S. PATENT DOCUMENTS 5,282,249 A * 1/1994 Cohen ................... H04N 7/163
235/382
5,819,226 A * 10/1998 Gopinathan ........... G06Q 20/00
705/44

(Continued)

FOREIGN PATENT DOCUMENTS

CN 101163014 A 4/2008
CN 101448001 A 6/2009
(Continued)

OTHER PUBLICATIONS

Extended European Search Report dated Jun. 22, 2018, in Application No. EP16752978.3, 10 pages.
(Continued)

*Primary Examiner* — Mohammad A. Nilforoush
*Assistant Examiner* — Wodajo Getachew
(74) *Attorney, Agent, or Firm* — Kilpatrick Townsend & Stockton LLP

(57) ABSTRACT

Systems and methods for token processing are disclosed. An access device can provide access device data to a mobile communication device. The communication device generates a token request including the access device data and communication device data and sends the token request to a server computer. The server computer returns a token and a token cryptogram to the mobile communication device. The token and the cryptogram may be used in a transaction.

18 Claims, 5 Drawing Sheets

Related U.S. Application Data

(60) Provisional application No. 62/117,291, filed on Feb. 17, 2015.

(51) Int. Cl.

| | | |
|---|---|---|
| *G06Q 20/38* | (2012.01) | |
| *G06Q 20/40* | (2012.01) | |
| *H04L 9/40* | (2022.01) | |
| *H04W 4/02* | (2018.01) | |
| *H04W 12/02* | (2009.01) | |
| *H04W 12/03* | (2021.01) | |
| *H04W 12/12* | (2021.01) | |
| *H04W 12/61* | (2021.01) | |
| *H04W 12/63* | (2021.01) | |
| *H04W 12/67* | (2021.01) | |
| *H04W 12/06* | (2021.01) | |

(52) U.S. Cl.
CPC ....... *G06Q 20/4015* (2020.05); *H04L 9/3228* (2013.01); *H04L 9/3234* (2013.01); *H04L 63/108* (2013.01); *H04W 4/02* (2013.01); *H04W 12/02* (2013.01); *H04W 12/03* (2021.01); *H04W 12/12* (2013.01); *H04W 12/61* (2021.01); *H04W 12/63* (2021.01); *H04W 12/67* (2021.01); *H04L 9/3213* (2013.01); *H04L 2209/56* (2013.01); *H04L 2209/80* (2013.01); *H04L 2463/121* (2013.01); *H04W 12/06* (2013.01); *H04W 12/068* (2021.01)

(58) Field of Classification Search
CPC ....... H04W 4/02; H04W 12/02; H04W 12/06; H04W 12/12; H04W 12/67; H04W 12/61; H04W 12/63; H04L 9/3213; H04L 9/3228; H04L 9/3234; H04L 63/107; H04L 63/108; H04L 2209/56; H04L 2209/80; H04L 2463/121
USPC ........................................................ 705/67
See application file for complete search history.

(56) References Cited

U.S. PATENT DOCUMENTS

| | | | | |
|---|---|---|---|---|
| 6,018,717 A * | 1/2000 | Lee | ............ | G07F 7/0866 |
| | | | | 705/13 |
| 6,167,517 A * | 12/2000 | Gilchrist | ............ | G06F 21/32 |
| | | | | 713/182 |
| 6,282,522 B1 * | 8/2001 | Davis | ............ | G06Q 20/02 |
| | | | | 235/375 |
| 6,829,711 B1 * | 12/2004 | Kwok | ............ | G06F 21/445 |
| | | | | 713/176 |
| 6,928,569 B2 * | 8/2005 | Rahman | ............ | G06F 13/385 |
| | | | | 713/400 |
| 7,127,068 B2 * | 10/2006 | Sundaravel | ............ | H04L 29/06 |
| | | | | 380/258 |
| 7,258,267 B2 * | 8/2007 | Choi | ............ | G06Q 20/40 |
| | | | | 235/375 |
| 7,503,489 B2 * | 3/2009 | Heffez | ............ | G06Q 20/32 |
| | | | | 235/380 |
| 7,567,934 B2 * | 7/2009 | Flitcroft | ............ | G06Q 20/24 |
| | | | | 705/37 |
| 7,861,286 B2 * | 12/2010 | M'Raihi | ............ | G06F 21/552 |
| | | | | 726/5 |
| 8,019,679 B2 * | 9/2011 | Bennett | ............ | G06Q 20/4016 |
| | | | | 705/39 |
| 8,583,723 B2 * | 11/2013 | Stewart | ............ | H04W 64/00 |
| | | | | 709/202 |
| 8,615,468 B2 * | 12/2013 | Varadarajan | ............ | G06Q 20/40 |
| | | | | 705/44 |
| 8,640,197 B2 * | 1/2014 | Heffez | ............ | H04L 63/18 |
| | | | | 726/2 |
| 8,827,154 B2 * | 9/2014 | Hammad | ............ | G06Q 20/3255 |
| | | | | 235/382 |
| 8,930,273 B2 * | 1/2015 | Varadarajan | ............ | G06Q 20/3433 |
| | | | | 705/44 |
| 9,038,886 B2 * | 5/2015 | Hammad | ............ | G06Q 20/385 |
| | | | | 235/375 |
| 9,178,877 B1 * | 11/2015 | Koneru | ............ | H04W 12/10 |
| 9,483,765 B2 * | 11/2016 | Sahadevan | ............ | G06Q 50/01 |
| 9,519,901 B1 * | 12/2016 | Dorogusker | ............ | G06Q 20/401 |
| 9,530,131 B2 * | 12/2016 | Patterson | ............ | G06Q 20/385 |
| 9,760,645 B1 * | 9/2017 | Park | ............ | G06K 19/06037 |
| 9,767,518 B1 * | 9/2017 | Martin | ............ | G06Q 40/10 |
| 9,775,029 B2 * | 9/2017 | Lopez | ............ | G06Q 20/32 |
| 9,830,595 B2 * | 11/2017 | Anderson | ............ | G06Q 20/12 |
| 9,911,121 B2 * | 3/2018 | Wankmueller | ............ | G06Q 20/32 |
| 10,069,864 B2 * | 9/2018 | Anantharaju | ............ | H04W 12/12 |
| 10,255,623 B2 | 4/2019 | Chatterton et al. | | |
| 10,304,147 B2 * | 5/2019 | Kelly | ............ | G07F 11/52 |
| 10,326,797 B1 * | 6/2019 | Murray | ............ | H04L 9/0825 |
| 10,361,856 B2 * | 7/2019 | Cassin | ............ | H04L 9/3213 |
| 10,373,148 B1 * | 8/2019 | Dixon | ............ | G06Q 20/3223 |
| 10,535,044 B2 * | 1/2020 | Feldman | ............ | G06Q 20/10 |
| 10,614,454 B1 * | 4/2020 | Brooks, V | ............ | H04L 63/105 |
| 10,708,366 B2 * | 7/2020 | Douglas | ............ | G01S 5/0236 |
| 10,878,413 B2 * | 12/2020 | Liu | ............ | G06F 21/34 |
| 10,922,672 B2 | 2/2021 | Chitalia et al. | | |
| 11,037,139 B1 * | 6/2021 | Ho | ............ | G06Q 20/3263 |
| 11,068,895 B2 * | 7/2021 | Kinagi | ............ | G06Q 20/4015 |
| 11,257,085 B1 * | 2/2022 | Barkas | ............ | G06Q 20/401 |
| 11,329,822 B2 * | 5/2022 | Cassin | ............ | G06Q 20/12 |
| 11,386,424 B2 * | 7/2022 | Dicker | ............ | H04L 9/0891 |
| 11,423,374 B2 * | 8/2022 | Hardin | ............ | H04L 41/06 |
| 2001/0027441 A1 * | 10/2001 | Wankmueller | ............ | G06Q 20/367 |
| | | | | 705/41 |
| 2001/0045451 A1 * | 11/2001 | Tan | ............ | G06Q 20/12 |
| | | | | 235/375 |
| 2001/0055393 A1 * | 12/2001 | Sundaravel | ............ | H04L 63/0428 |
| | | | | 380/258 |
| 2002/0076204 A1 * | 6/2002 | Nakano | ............ | G11B 20/00086 |
| | | | | 360/60 |
| 2002/0128977 A1 * | 9/2002 | Nambiar | ............ | G06Q 20/382 |
| | | | | 705/64 |
| 2002/0152178 A1 * | 10/2002 | Lee | ............ | G06Q 20/3674 |
| | | | | 705/67 |
| 2002/0174345 A1 * | 11/2002 | Patel | ............ | H04L 63/0428 |
| | | | | 713/186 |
| 2003/0021418 A1 * | 1/2003 | Arakawa | ............ | H04L 9/0891 |
| | | | | 380/277 |
| 2003/0028481 A1 * | 2/2003 | Flitcroft | ............ | G06Q 40/04 |
| | | | | 705/39 |
| 2003/0111526 A1 * | 6/2003 | Smith | ............ | G06Q 20/0425 |
| | | | | 235/379 |
| 2003/0163483 A1 * | 8/2003 | Zingher | ............ | G06Q 10/10 |
| 2003/0172273 A1 * | 9/2003 | Hans | ............ | G06Q 20/4014 |
| | | | | 713/172 |
| 2003/0187805 A1 * | 10/2003 | Shen | ............ | H04L 63/045 |
| | | | | 705/80 |
| 2003/0229795 A1 * | 12/2003 | Kunigkeit | ............ | G06F 21/87 |
| | | | | 713/189 |
| 2004/0033813 A1 * | 2/2004 | Sakamura | ............ | G06Q 20/341 |
| | | | | 455/515 |
| 2004/0034784 A1 * | 2/2004 | Fedronic | ............ | G07F 7/1025 |
| | | | | 713/186 |
| 2004/0059685 A1 * | 3/2004 | Sakamura | ............ | G06Q 20/3678 |
| | | | | 705/65 |
| 2004/0118914 A1 * | 6/2004 | Smith | ............ | H04M 17/10 |
| | | | | 235/380 |
| 2004/0127256 A1 * | 7/2004 | Goldthwaite | ............ | G06K 7/0073 |
| | | | | 455/466 |
| 2004/0168063 A1 * | 8/2004 | Revital | ............ | H04N 21/4623 |
| | | | | 713/172 |
| 2004/0236696 A1 * | 11/2004 | Aoki | ............ | G06Q 20/403 |
| | | | | 705/50 |
| 2004/0236819 A1 * | 11/2004 | Anati | ............ | H04L 63/0853 |
| | | | | 709/200 |

(56) References Cited

U.S. PATENT DOCUMENTS

| | | | |
|---|---|---|---|
| 2004/0250066 A1* | 12/2004 | Di Luoffo | G06Q 20/4097 713/168 |
| 2005/0027667 A1* | 2/2005 | Kroll | G06Q 20/4037 |
| 2005/0043997 A1* | 2/2005 | Sahota | G06Q 20/4018 705/16 |
| 2005/0050366 A1* | 3/2005 | Kwok | G06F 21/34 726/19 |
| 2005/0133588 A1* | 6/2005 | Williams | G06Q 20/4016 235/379 |
| 2005/0137975 A1* | 6/2005 | Williams | G06Q 40/08 705/40 |
| 2005/0138390 A1* | 6/2005 | Adams | G06F 1/1656 713/185 |
| 2005/0149438 A1* | 7/2005 | Williams | G07G 1/14 705/40 |
| 2005/0150945 A1* | 7/2005 | Choi | G06Q 20/108 235/379 |
| 2005/0165684 A1* | 7/2005 | Jensen | G06Q 20/425 705/44 |
| 2005/0188167 A1* | 8/2005 | Squibbs | G06F 21/31 711/163 |
| 2005/0195975 A1* | 9/2005 | Kawakita | H04L 9/3236 380/30 |
| 2005/0211771 A1* | 9/2005 | Onozu | G06Q 20/341 235/383 |
| 2006/0032905 A1* | 2/2006 | Bear | G06K 7/0008 235/380 |
| 2006/0049256 A1* | 3/2006 | von Mueller | G06Q 20/3552 705/64 |
| 2006/0229893 A1* | 10/2006 | Cole | G06Q 50/184 705/39 |
| 2007/0011066 A1* | 1/2007 | Steeves | G06Q 20/3829 705/35 |
| 2007/0022058 A1* | 1/2007 | Labrou | G07F 7/1008 705/67 |
| 2007/0071197 A1* | 3/2007 | Ryoo | H04M 17/103 379/114.15 |
| 2008/0061150 A1* | 3/2008 | Phillips | G06K 19/07769 705/41 |
| 2008/0061151 A1* | 3/2008 | Phillips | G06K 19/07716 235/492 |
| 2008/0068181 A1* | 3/2008 | Phillips | G06K 19/07762 340/572.7 |
| 2008/0091944 A1* | 4/2008 | von Mueller | G06Q 20/12 713/168 |
| 2008/0121707 A1* | 5/2008 | Phillips | G06K 19/07769 235/492 |
| 2008/0165006 A1* | 7/2008 | Phillips | G07F 7/0806 340/572.1 |
| 2008/0208759 A1* | 8/2008 | Royyuru | G06Q 20/4012 705/72 |
| 2008/0210754 A1* | 9/2008 | Lovett | G06Q 20/24 235/380 |
| 2008/0280626 A1* | 11/2008 | Choi | H04L 67/18 455/456.1 |
| 2009/0102712 A1* | 4/2009 | Heffez | G06Q 20/3224 342/357.55 |
| 2009/0121029 A1* | 5/2009 | Asnaashari | G06F 21/79 235/492 |
| 2009/0144205 A1* | 6/2009 | Hurry | H04N 21/42684 705/44 |
| 2009/0187492 A1* | 7/2009 | Hammad | G06Q 40/128 705/26.1 |
| 2009/0235339 A1* | 9/2009 | Mennes | H04L 9/3273 726/5 |
| 2009/0248560 A1* | 10/2009 | Recce | G06Q 40/00 705/35 |
| 2009/0249077 A1* | 10/2009 | Gargaro | G06Q 20/382 713/183 |
| 2009/0327107 A1 | 12/2009 | Lal et al. | |
| 2010/0015993 A1* | 1/2010 | Dingler | H04L 67/18 455/456.1 |
| 2010/0051684 A1* | 3/2010 | Powers | G06Q 20/4016 235/379 |
| 2010/0088237 A1* | 4/2010 | Wankmueller | G06Q 20/382 705/64 |
| 2010/0131413 A1* | 5/2010 | Kranzley | G06Q 20/349 705/66 |
| 2010/0199327 A1* | 8/2010 | Keum | H04N 7/17318 726/3 |
| 2010/0241867 A1* | 9/2010 | Brown | G06Q 20/40975 713/185 |
| 2010/0262834 A1* | 10/2010 | Freeman | G06F 21/33 713/184 |
| 2010/0274627 A1* | 10/2010 | Carlson | G06Q 20/3224 705/51 |
| 2011/0092185 A1 | 4/2011 | Garskof et al. | |
| 2011/0112968 A1* | 5/2011 | Florek | G06Q 20/3226 705/50 |
| 2011/0173124 A1* | 7/2011 | Feldman | G06Q 20/401 713/168 |
| 2011/0196791 A1* | 8/2011 | Dominguez | G06Q 20/40 705/44 |
| 2011/0208601 A1* | 8/2011 | Ferguson | G06Q 20/4016 705/16 |
| 2011/0208658 A1* | 8/2011 | Makhotin | G06Q 20/401 705/75 |
| 2011/0276495 A1* | 11/2011 | Varadarajan | H04L 63/0838 705/64 |
| 2011/0307724 A1* | 12/2011 | Shaw | G06F 21/34 713/323 |
| 2012/0018511 A1* | 1/2012 | Hammad | G06Q 20/385 235/380 |
| 2012/0028609 A1* | 2/2012 | Hruska | H04W 12/02 455/411 |
| 2012/0041881 A1* | 2/2012 | Basu | G06Q 20/3672 705/67 |
| 2012/0123841 A1* | 5/2012 | Taveau | G06Q 20/32 705/14.23 |
| 2012/0136796 A1* | 5/2012 | Hammad | G06Q 20/385 705/67 |
| 2012/0173431 A1 | 7/2012 | Ritchie et al. | |
| 2012/0185398 A1* | 7/2012 | Weis | G06Q 20/4015 705/16 |
| 2012/0233456 A1* | 9/2012 | Spitz | G06F 21/34 713/155 |
| 2012/0287022 A1* | 11/2012 | Queen | G09G 5/006 345/2.1 |
| 2012/0290389 A1* | 11/2012 | Greenough | G06Q 20/3224 705/14.53 |
| 2012/0290478 A1* | 11/2012 | Crofts | G06Q 40/00 705/44 |
| 2012/0330837 A1* | 12/2012 | Persaud | G06Q 20/405 705/44 |
| 2013/0042307 A1* | 2/2013 | Imamura | H04L 69/28 726/4 |
| 2013/0054474 A1* | 2/2013 | Yeager | G06Q 20/02 705/71 |
| 2013/0110728 A1* | 5/2013 | Kobres | H04W 12/10 705/78 |
| 2013/0132283 A1* | 5/2013 | Hayhow | G06Q 20/1085 705/67 |
| 2013/0144888 A1* | 6/2013 | Faith | G06F 16/338 707/748 |
| 2013/0165071 A1* | 6/2013 | Jonasson | H04L 12/1457 455/406 |
| 2013/0191290 A1* | 7/2013 | Glendenning | G06Q 20/388 705/71 |
| 2013/0191884 A1 | 7/2013 | Leicher et al. | |
| 2013/0218769 A1* | 8/2013 | Pourfallah | G06Q 20/10 705/44 |
| 2013/0226800 A1* | 8/2013 | Patel | H04L 63/107 705/44 |
| 2013/0238536 A1* | 9/2013 | Outwater | G07F 15/005 706/12 |
| 2013/0252583 A1* | 9/2013 | Brown | H04L 63/0807 455/411 |

(56) References Cited

U.S. PATENT DOCUMENTS

| | | | |
|---|---|---|---|
| 2013/0283040 A1* | 10/2013 | Tu | H04W 4/60 726/5 |
| 2013/0290714 A1* | 10/2013 | Hans | H04L 9/3273 713/168 |
| 2013/0305328 A1* | 11/2013 | Leung | H04L 63/0807 726/6 |
| 2013/0311313 A1* | 11/2013 | Laracey | G06Q 20/3278 705/16 |
| 2013/0339167 A1* | 12/2013 | Taylor | G06Q 20/387 705/21 |
| 2014/0052497 A1* | 2/2014 | Varghese | G06Q 30/0205 705/7.34 |
| 2014/0058855 A1* | 2/2014 | Hussein | G06Q 20/321 705/16 |
| 2014/0058865 A1* | 2/2014 | Yang | G06Q 20/327 705/21 |
| 2014/0067683 A1* | 3/2014 | Varadarajan | G06Q 20/04 705/44 |
| 2014/0081874 A1* | 3/2014 | Lewis | G07F 19/202 705/72 |
| 2014/0114857 A1* | 4/2014 | Griggs | G06Q 40/00 705/44 |
| 2014/0258132 A1* | 9/2014 | Swamy | G06Q 20/3278 705/67 |
| 2014/0263622 A1* | 9/2014 | Babatz | G06Q 20/34 235/380 |
| 2014/0283120 A1* | 9/2014 | Mao | H04L 63/107 726/28 |
| 2014/0310159 A1* | 10/2014 | Zoldi | G06Q 30/02 705/39 |
| 2014/0337138 A1* | 11/2014 | Chitalia | G06Q 20/20 705/14.64 |
| 2014/0372308 A1* | 12/2014 | Sheets | G06Q 20/32 705/44 |
| 2014/0375422 A1* | 12/2014 | Huber | G07C 9/00571 340/5.61 |
| 2015/0006330 A1* | 1/2015 | Polack | G06Q 30/0635 705/26.81 |
| 2015/0012430 A1* | 1/2015 | Chisholm | G06Q 20/34 705/44 |
| 2015/0032625 A1* | 1/2015 | Dill | H04L 9/32 705/44 |
| 2015/0032626 A1 | 1/2015 | Dill et al. | |
| 2015/0046336 A1* | 2/2015 | Cummins | G06Q 20/3829 705/65 |
| 2015/0046338 A1 | 2/2015 | Laxminarayanan et al. | |
| 2015/0088674 A1* | 3/2015 | Flurscheim | G06Q 20/3274 705/17 |
| 2015/0088756 A1* | 3/2015 | Makhotin | G06Q 20/32 705/71 |
| 2015/0089590 A1* | 3/2015 | Krishnan | A61N 1/37235 726/3 |
| 2015/0112870 A1 | 4/2015 | Nagasundaram et al. | |
| 2015/0127547 A1* | 5/2015 | Powell | G06Q 20/382 705/67 |
| 2015/0178724 A1* | 6/2015 | Ngo | G06Q 20/3672 705/71 |
| 2015/0180836 A1* | 6/2015 | Wong | G06Q 20/326 713/172 |
| 2015/0227935 A1* | 8/2015 | Adjaoute | G06Q 50/265 705/44 |
| 2015/0246338 A1* | 9/2015 | Winks | B01J 20/12 210/683 |
| 2015/0262161 A1* | 9/2015 | McMullan | G06Q 20/385 705/39 |
| 2015/0262180 A1* | 9/2015 | Hambleton | G06Q 40/02 705/71 |
| 2015/0312038 A1* | 10/2015 | Palanisamy | G06F 21/33 713/155 |
| 2015/0324771 A1* | 11/2015 | Capps | G06Q 20/102 705/40 |
| 2015/0327208 A1 | 11/2015 | Qiu et al. | |
| 2015/0339664 A1* | 11/2015 | Wong | H04L 63/0823 705/71 |
| 2016/0036790 A1* | 2/2016 | Shastry | H04L 63/0876 713/168 |
| 2016/0057248 A1* | 2/2016 | Tankha | H04L 67/306 726/6 |
| 2016/0057619 A1* | 2/2016 | Lopez | G06F 9/455 380/247 |
| 2016/0063500 A1* | 3/2016 | Sherlock | G06Q 20/40 705/44 |
| 2016/0078445 A1* | 3/2016 | Einhorn | G06Q 20/4014 705/21 |
| 2016/0080364 A1* | 3/2016 | Karimzadeh | G06F 21/6245 726/6 |
| 2016/0092872 A1* | 3/2016 | Prakash | G06Q 20/322 705/65 |
| 2016/0098790 A1* | 4/2016 | Herman | G06Q 30/0633 705/39 |
| 2016/0132877 A1* | 5/2016 | Carrott | G06Q 20/3829 705/71 |
| 2016/0140561 A1* | 5/2016 | Cowan | G06Q 20/20 705/26.35 |
| 2016/0148197 A1* | 5/2016 | Dimmick | G06Q 20/36 705/67 |
| 2016/0150394 A1* | 5/2016 | Varoglu | H04W 4/029 455/418 |
| 2016/0189159 A1* | 6/2016 | Luk | G06Q 20/3224 705/39 |
| 2016/0191236 A1* | 6/2016 | Smirnoff | H04L 63/062 713/171 |
| 2016/0217467 A1* | 7/2016 | Smets | G06Q 20/3227 |
| 2016/0239835 A1* | 8/2016 | Marsyla | G06Q 20/3829 |
| 2016/0241402 A1* | 8/2016 | Gordon | H04L 9/3231 |
| 2016/0241543 A1* | 8/2016 | Jung | H04L 63/083 |
| 2016/0253651 A1* | 9/2016 | Park | G06Q 20/322 705/39 |
| 2016/0267280 A1* | 9/2016 | Mansour | H04L 9/0861 |
| 2016/0283942 A1* | 9/2016 | Chitragar | G06Q 20/327 |
| 2016/0294556 A1* | 10/2016 | Vortriede | H04L 9/3242 |
| 2016/0295404 A1* | 10/2016 | Gouget | H04L 63/0876 |
| 2016/0300224 A1* | 10/2016 | Liu | G06K 19/06112 |
| 2016/0307190 A1* | 10/2016 | Zarakas | G06Q 20/321 |
| 2016/0364730 A1* | 12/2016 | Rans | G06Q 20/40145 |
| 2016/0380774 A1* | 12/2016 | Lovelock | G06Q 50/265 713/169 |
| 2017/0004484 A1* | 1/2017 | Seol | G06Q 20/227 |
| 2017/0006433 A1 | 1/2017 | Mark et al. | |
| 2017/0011404 A1* | 1/2017 | Clower | G06Q 40/02 |
| 2017/0061419 A1* | 3/2017 | Kim | G06Q 10/00 |
| 2017/0068953 A1* | 3/2017 | Kim | G06Q 20/382 |
| 2017/0085563 A1* | 3/2017 | Royyuru | G06Q 30/0277 |
| 2017/0109740 A1* | 4/2017 | Besch | G06Q 20/102 |
| 2017/0132629 A1* | 5/2017 | Jung | G06Q 20/409 |
| 2017/0200160 A1* | 7/2017 | Kumar | H04L 63/083 |
| 2017/0228723 A1* | 8/2017 | Taylor | H04L 63/0807 |
| 2017/0236113 A1* | 8/2017 | Chitalia | G06Q 20/3276 705/44 |
| 2017/0243417 A1* | 8/2017 | Manikantan Shila | B66B 1/468 |
| 2017/0262842 A1* | 9/2017 | Subbarayan | G06Q 20/38215 |
| 2017/0270527 A1* | 9/2017 | Rampton | G06Q 20/3223 |
| 2017/0270528 A1* | 9/2017 | Prakash | G06Q 20/3224 |
| 2017/0308895 A1* | 10/2017 | Srivastava | H04L 9/0819 |
| 2017/0330181 A1* | 11/2017 | Ortiz | G06Q 30/0226 |
| 2017/0330188 A1* | 11/2017 | Canh | G06Q 20/385 |
| 2017/0346850 A1* | 11/2017 | Jin | G06F 21/335 |
| 2017/0373852 A1* | 12/2017 | Cassin | H04L 63/062 |
| 2018/0006821 A1* | 1/2018 | Kinagi | H04L 9/3234 |
| 2018/0026973 A1* | 1/2018 | Le Saint | G06Q 20/3821 713/168 |
| 2018/0108008 A1* | 4/2018 | Chumbley | G06Q 20/36 |
| 2018/0121891 A1* | 5/2018 | Hosny | G06Q 20/027 |
| 2018/0121895 A1* | 5/2018 | Mohrlock | G06Q 20/10 |
| 2018/0124596 A1* | 5/2018 | Iannace | H04W 24/08 |
| 2018/0176017 A1* | 6/2018 | Rodriguez | H04L 63/0861 |
| 2018/0181948 A1* | 6/2018 | Sharma | G06Q 20/3274 |
| 2018/0197263 A1* | 7/2018 | Pearson | H04L 9/3247 |
| 2018/0255460 A1* | 9/2018 | Hammad | G06Q 20/3825 |

(56) References Cited

U.S. PATENT DOCUMENTS

| | | | |
|---|---|---|---|
| 2018/0268406 A1* | 9/2018 | Rice | G06Q 20/20 |
| 2018/0300730 A1* | 10/2018 | Telford-Reed | G06F 21/32 |
| 2019/0139023 A1* | 5/2019 | Vyas | G06Q 20/3224 |
| 2019/0236599 A1* | 8/2019 | Jeong | G06Q 20/34 |
| 2019/0281406 A1* | 9/2019 | Lalka | H04W 4/02 |
| 2019/0325509 A1* | 10/2019 | Nair | H04W 4/33 |
| 2019/0379667 A1* | 12/2019 | Touboul | H04L 63/20 |
| 2020/0058068 A1* | 2/2020 | Gandhi | G06Q 20/382 |
| 2020/0104830 A1* | 4/2020 | Hart | G06K 19/0723 |
| 2020/0118137 A1* | 4/2020 | Sood | G06F 3/04817 |
| 2020/0294106 A1* | 9/2020 | Seshan | G06Q 20/10 |
| 2020/0349573 A1* | 11/2020 | Dong | G06N 5/022 |
| 2021/0012339 A1* | 1/2021 | Rafferty | G06Q 20/3223 |
| 2021/0073809 A1* | 3/2021 | Liu | G06K 19/06112 |
| 2021/0201296 A1* | 7/2021 | Rule | G07F 7/0833 |
| 2021/0279717 A1* | 9/2021 | Gupta | G06Q 20/352 |
| 2021/0312025 A1* | 10/2021 | Mars | G06F 21/36 |
| 2021/0312448 A1* | 10/2021 | Kinagi | G06Q 20/223 |
| 2021/0326818 A1* | 10/2021 | Hogg | G06Q 20/085 |
| 2021/0344660 A1* | 11/2021 | Benkreira | G06Q 40/02 |

FOREIGN PATENT DOCUMENTS

| | | |
|---|---|---|
| CN | 102377569 A | 3/2012 |
| WO | 2013025456 A1 | 2/2013 |
| WO | 2014/174506 A1 | 10/2014 |

OTHER PUBLICATIONS

Jiang et al., "Trust Calculation Model Based on Social Network and Evidence Theory", International Joint Conference on Service Sciences, 2011.

International Search Report and Written Opinion, dated Jun. 8, 2016 in PCT Application No. PCT/US2016/018267, 10 pages.

Written Opinion dated Mar. 7, 2018, in Singaporean Application No. SG11201705489T, 5 pages.

Chinese Office Action mailed in Chinese Application No. CN 201680008380.0 dated May 13, 2020, 22 pages.

Office Action, dated Aug. 9, 2023, for Chinese Application No. CN202110780099.1, 11 pages.

Guan et al., "Research on the Application of Custom Security Tokens in Web Service Security", Available online at: http://www.cqvip.com, Aug. 26, 2006, pp. 19-22.

* cited by examiner

TOKEN AND CRYPTOGRAM USING TRANSACTION SPECIFIC INFORMATION

This patent application is a continuation of U.S. application Ser. No. 15/540,759, filed Jun. 29, 2017, which is a 371 National Stage Entry of International Application No. PCT/US2016/018267, filed Feb. 17, 2016, which is a non-provisional application of and claims the benefit of U.S. Provisional Application No. 62/117,291, filed on Feb. 17, 2015, which are herein incorporated by reference in their entirety for all purposes.

BACKGROUND

Tokens can be used to protect against data breaches. For example, tokens can be used to replace personal information such as driver's license numbers, account information, and social security numbers. Tokenizing information can reduce the risk of fraud, because unlike real information, a compromised token can be easily replaced so that the compromised token is rendered useless. Although tokens minimize risk, a fraudster may still potentially capture a token at the point of use and may attempt to immediately reuse the token. Further, a device (e.g., smartphone) provisioned with a token can also be stolen and used in a fraudulent manner.

Other problems also exist. For example, whether or not tokens are used, a party such as a merchant during a merchant transaction could inadvertently initiate the transaction for a different amount than what is displayed to the user for approval.

Embodiments of the present invention address these and other problems individually and collectively.

BRIEF SUMMARY

Embodiments of the invention relate to a cloud based single-use token processing system for performing transactions.

One embodiment of the invention is directed to a method comprising: receiving access device data by a mobile communication device from an access device; generating, by the mobile communication device, a token request including the access device data and communication device data; sending, by the mobile communication device, the token request to a server computer, wherein the server computer thereafter determines a token and generates a cryptogram, wherein the cryptogram was generated using the access device data and the communication device data: receiving, by the mobile communication device, the token and the cryptogram; and providing, by the mobile communication device, the token and the cryptogram to the access device, wherein the access device forwards the cryptogram and the token to the server computer, which verifies the cryptogram and processes the token.

Processing the token may include any suitable activity involving the token. For example, processing the token may involve transmitting a message including the token to another computer so that the computer can verify or determine an underlying identifier associated with the token. Processing the token could alternatively include determining the underlying identifier associated with the token and/or performing additional authentication or fraud processing on the token.

Another embodiment of the invention is directed a mobile communication device configured to perform the above-noted method.

Another embodiment of the invention is directed to a method comprising providing, by an access device, access device data to a mobile communication device, wherein the mobile communication device generates a token request including the access device data and communication device data and sends the token request to a server computer, which returns a token and a token cryptogram to the mobile communication device; receiving, by the access device, the token and the cryptogram from the mobile communication device; generating, by the access device, an authorization request message; and transmitting, by the access device, the authorization request message to the server computer, wherein the server computer verifies the cryptogram and processes the transaction using the token.

Another embodiment of the invention is directed to an access device configured to perform the above-noted method.

Further details regarding embodiments of the invention are described in the Figures with reference to the Detailed Description.

DETAILED DESCRIPTION

Figure 1:
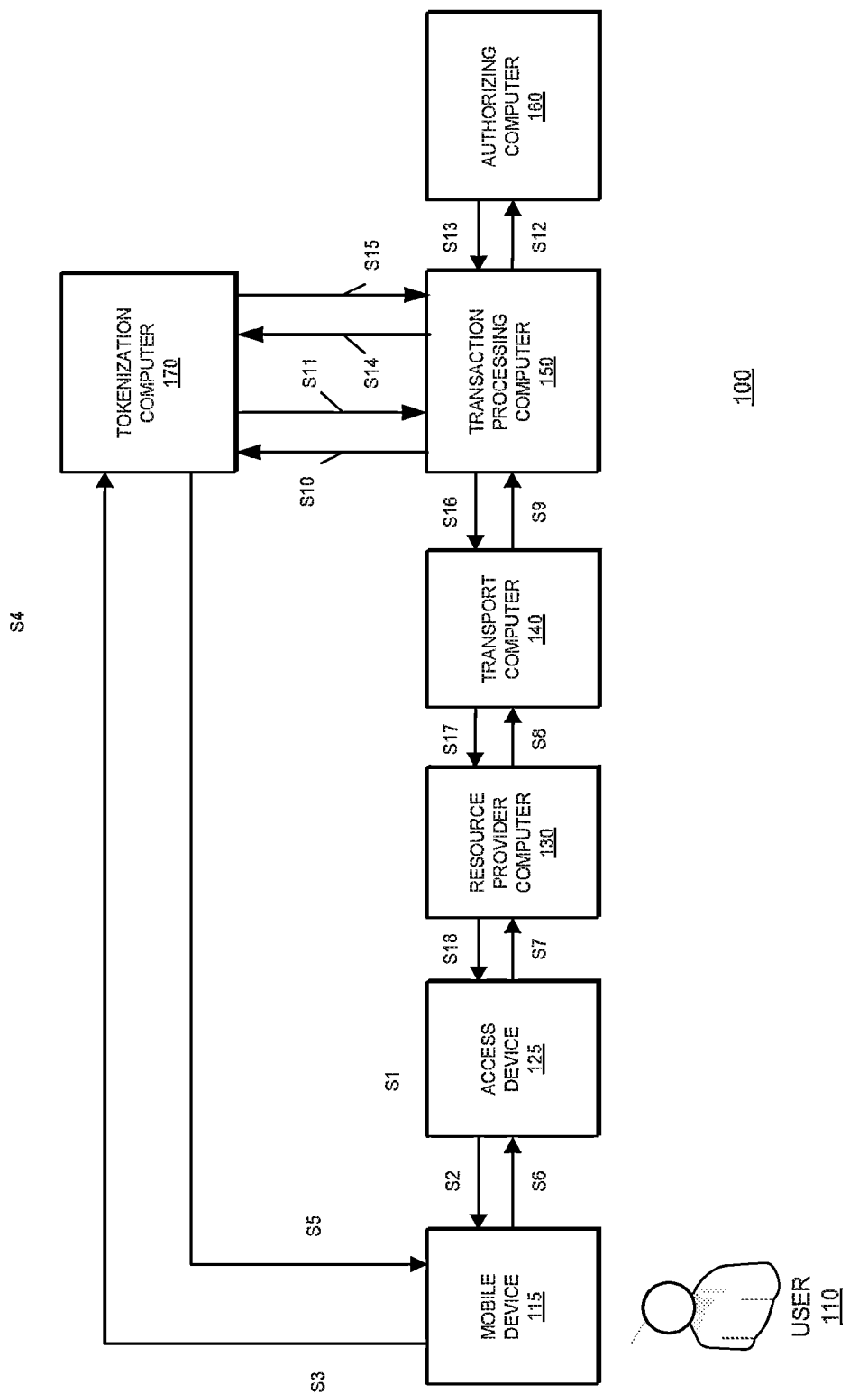
FIG. 1 shows a block diagram of a first transaction system according to embodiments of the invention. Steps in a process flow of a user performing a payment transaction are illustrated in FIG. 1.

Embodiments of the invention can incorporate a cloud based token processing system and method for performing transactions. The types of transactions in which embodiments of the invention can be used include, but are not limited to, access transactions (e.g., when a user attempts to enter a location, venue, or building), payment transactions, and data request transactions.

In one embodiment of the invention, a mobile communication device (e.g., a smartphone) belonging to a user may capture a Quick Response (QR) code displayed on a merchant POS terminal. The QR code may encode transaction specific information, location information, merchant-related information (e.g., merchant identifier), and any other relevant information. Upon capturing the QR code, the mobile communication device may request a token and a cryptogram from a remote server computer (which may be a cloud based token generation and verification system) using at least the information encoded in the QR code. After the mobile communication device obtains the token and the cryptogram, the mobile communication device may then pass the token and the cryptogram to the POS terminal. The POS terminal may then generate and send an authorization request message that includes at least some of the information encoded in the QR code, the token, and the cryptogram to an issuer computer operated by the issuer of the account number that was used to create the token and/or to a transaction processing computer. One or both of these computers then receives the authorization request message and validates the cryptogram using information in the authorization request message and a shared encryption key. The issuer computer or the transaction processing computer may then determine a risk level for the transaction by (i) matching the transaction data in the cryptogram and the authorization request message, (ii) ensuring that the device is in a reasonable proximity to the merchant terminal (e.g., POS terminal), and/or (iii) determining whether a recent transaction count associated with the device is reasonable.

Embodiments of the invention improve transaction security relative to conventional methods and systems. For example, the cryptogram that is generated according to embodiments of the invention limits the transaction to one that has the corresponding transaction-specific information that may be passed in an authorization request message (e.g., transaction amount, merchant location, time, date, account identifier, expiration date, CVV, etc.), as well as information surrounding the interaction between the mobile device and the access device at the point of sale.

Before discussing embodiments of the invention in detail, some terms are described in further detail below.

A "mobile communication device" or a "mobile device" may comprise any suitable electronic device that may be transported and operated by a user, which may also provide remote communication capabilities to a network, Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "payment device" may include any suitable device that may be used to conduct a financial transaction, such as to provide payment credentials to a merchant. The payment device may be a software object, a hardware object, or a physical object. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc, Such devices can operate in either a contact or contactless mode. In some embodiments, a mobile device can function as a payment device (e.g., a mobile device can store and be able to transmit payment credentials for a transaction), "Communication device data" may include any suitable data associated with a communication device, Such data may be stored within a communication, and in some cases, it may exist independent of any communication with an access device at a resource provider. Examples of communication device data may include account identifiers stored on the communication device, device identifiers, authentication data relating to authentication processes performed by a communication device (e.g., biometric templates, stared secrets such as passwords, etc.), timestamps created by the communication device, etc.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A "value credential" may be information associated with worth. Examples of value credentials include payment credentials, coupon identifiers, information needed to obtain a promotional offer, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. Payment credentials may be any information that identifies or is associated with a payment account. Payment credentials may be provided in order to make a payment from a payment account. Payment credentials can also include a user name, an expiration date, a gift card number or code, and any other suitable information.

An "application" may be computer code or other data stored on a computer readable medium (e.g. memory element or secure element) that may be executable by a processor to complete a task.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may allow the user to load one or more payment cards onto the digital wallet so as to make a payment without having to enter an account number or present a physical card.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile device or access device. Additionally, a digital wallet provider may also provide one or more of the following functions: storing multiple payment cards and other payment products on behalf of a user, storing other information including billing address, shipping addresses, and transaction history, and initiating a transaction by one or more methods.

A "token" may be a substitute value for a credential. A token may be a string of numbers, letters, or any other suitable characters. Examples of tokens include payment tokens; access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization may be used to enhance transaction efficiency and improve transaction security.

A "tokenization computer" or "token service system" can include a system that services payment tokens. In some embodiments, a token service system can facilitate requesting, determining (e.g., generating) and/or issuing tokens, as well as maintaining an established mapping of tokens to primary account numbers (PANS) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

A "token expiry date" may refer to the expiration date/time of the token. The token expiry date may be passed among the entities of the tokenization ecosystem during transaction processing to ensure interoperability. The token expiration date may be a numeric value (e.g. a 4-digit numeric value).

A "token request message" or "token request" may be an electronic message for requesting a token. In some embodiments, a token request message may include information usable for identifying a payment account or digital wallet, and/or information for generating a token. For example, a token request message may include payment credentials, mobile device identification information (e.g. a phone number or MS ISDN), a digital wallet identifier, information identifying a tokenization service provider, a merchant identifier, a cryptogram, and/or any other suitable information. Information included in a token request message can be encrypted (e.g., with an issuer-specific key). In some embodiments, a token request message may include a flag or other indicator specifying that the message is a token request message.

A "token response message" or "token response" may be a message that responds to a token request. A token response message may include an indication that a token request was approved or denied. A token response message may also include a token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, a token response message may include a flag or other indicator specifying that the message is a token response message.

A "cryptogram" may include encrypted characters. Cryptograms can be of any suitable length and may be formed using any suitable data transformation process. Exemplary data transformation processes include encryption, and encryption processes such as DES, triple DES, AES, and ECC may be used. Keys used with such encryption process can be of any appropriate length and may have any suitable characteristics.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. An authorizing entity may operate an authorizing computer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

"Access device data" may include any suitable data obtained from an access device. Examples of access device data may include a merchant identifier, transaction amount, location information (e.g., a GPS location of the access device), transaction timestamp, an access device identifier, etc.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message. The authorization response message may be generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

A "processor" may include a a central processing unit (CPU). A processor can include a single-core processor, a plurality of single-core processors, a multi-core processor, a plurality of multi-core processors, or any other suitable combination of hardware configured to perform arithmetical, logical, and/or input/output operations of a computing device.

FIG. 1 shows a block diagram and a flow diagram of a token processing system 100 according to embodiments of the invention. The token processing system 100 may be used to perform payment transactions.

The token processing system 100 comprises a mobile device 115 that can interact with an access device 125. The access device 125 may communicate with an authorization computer 160 via a resource provider computer 130, a transport computer 140, and a transaction processing computer 150. The mobile device 115 may also communicate with the tokenization computer 170. Each of the computers and devices shown in FIG. 1 may communicate using any suitable communications network. Suitable communications networks may be any one and/or the combination of the following; a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Figure 2:
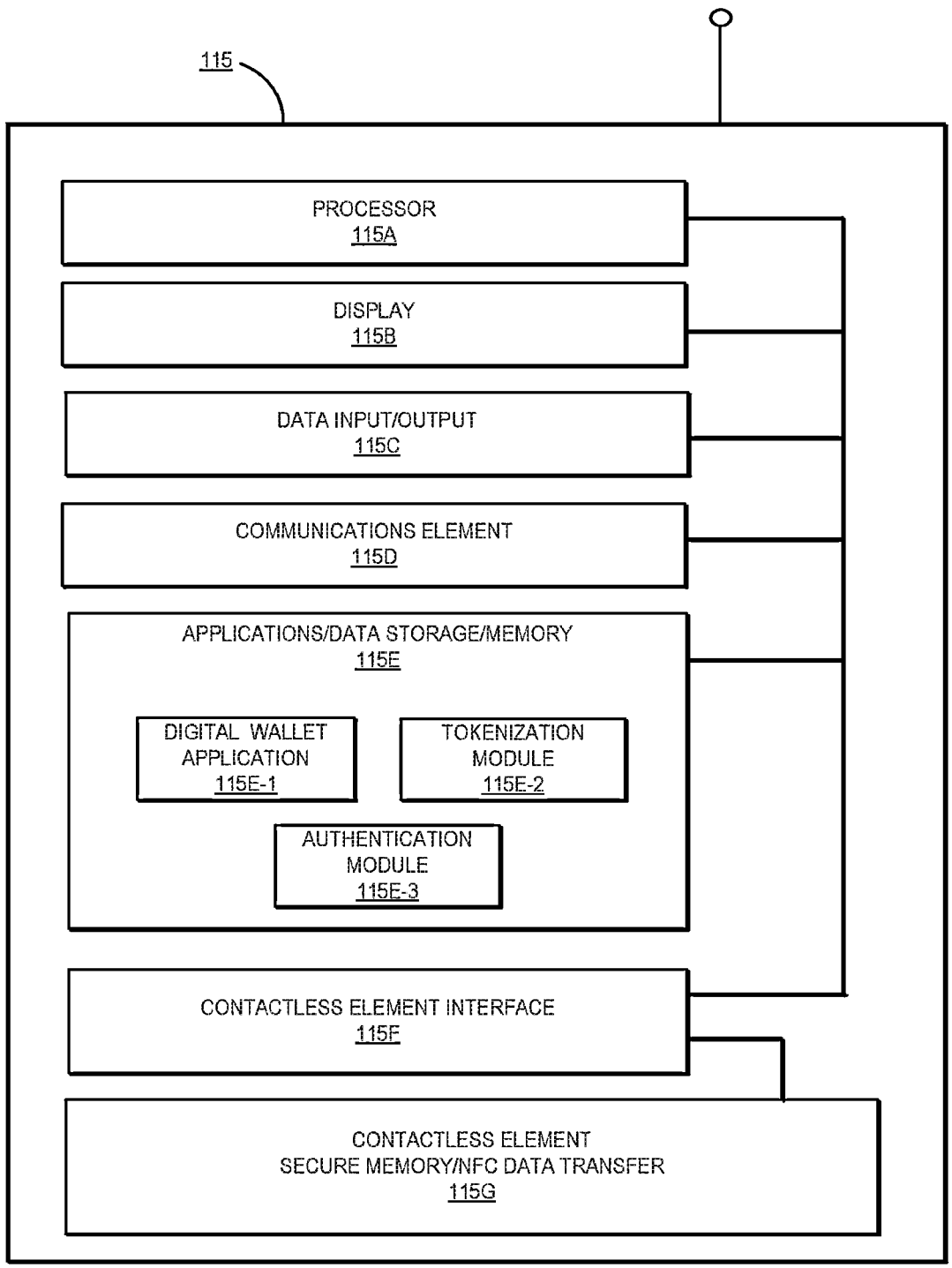
FIG. 2 shows a block diagram of a mobile communication device according to an embodiment of the invention.

FIG. 2 shows a detailed block diagram of a mobile device 115 according to an embodiment of the invention.

Mobile device 115 may include circuitry that is used to enable certain device functions, such as telephony. The functional elements responsible for enabling those functions may include a processor 115A that can execute instructions that implement the functions and operations of the device. Processor 115A may access memory 115E (or another suitable data storage region or element) to retrieve instructions or data used in executing the instructions, such as provisioning scripts and mobile applications.

Data input/output elements 115C, such as a biometric scanner (e.g., a fingerprint or retinal scanner), keyboard or touchscreen, can allow a user to operate the mobile device 115 and input data (e.g., user authentication data). Other data input elements can include a camera, which can be used to capture a two dimensional code (e.g., a QR code) that is displayed on an access device or other device. Data input/output elements may also be configured to output data (via a speaker, for example). An example of an output element may include a display 115B that may be used to output data to a user.

Communications element 115D may be used to enable data transfer between mobile device 115 and a wired or wireless network (via antenna 115H, for example) to assist in connectivity to the Internet or other network, and enabling data transfer functions. Mobile device 115 may also include contactless element interface 115F to enable data transfer between contactless element 115E and other elements of the device, where contactless element 115G may include a secure memory and a near field communications data transfer element (or another form of short range communications technology).

As noted, a cellular phone or similar device is an example of a mobile device 115 that may be used in accordance with embodiments of the present invention. However, other forms or types of devices may be used without departing from the underlying concepts of the invention. For example, the mobile device 115 may alternatively be in the form of a payment card, a key fob, a tablet computer, a wearable device, etc.

The memory 115E may comprise a digital wallet application 115E-1, a tokenization module 115E-2, and an authentication module 115E-3, and any other suitable module or data. The mobile device 115 may have any number of mobile applications installed or stored on the memory 115E and is not limited to that shown in FIG. 7. The memory 115E may also comprise code, executable by the processor 115A for implementing a method comprising: receiving access device data from an access device; generating a token request including the access device data and communication device data; sending the token request to a server computer, wherein the server computer thereafter determines a token associated with the user and generates a cryptogram, wherein the cryptogram was generated using the access device data and the communication device data; receiving the token and the cryptogram; and providing the token and the cryptogram to the access device, wherein the access device forwards the cryptogram and the token to the server computer, which verifies the cryptogram and processes the token. In some embodiments, the memory 115E may also comprise a secure element, which may store encryption keys, account identifiers, and/or tokens and cryptograms.

The digital wallet application 115E-1 may provide a user interface for the user 110 to provide input and initiate, facilitate, and manage transactions using the mobile device 115. The digital wallet application 115E-1 may be able to store and/or access a payment token and/or payment credentials. The digital wallet application 115E-1 may also store an issuer-specific key, or any other suitable encryption means. The digital wallet application 115E-1 may be able to cause the mobile device 115 to transmit the payment token and/or payment credentials in any suitable manner (e.g., NFC, QR code, etc.).

The digital wallet application 115E-1 may be associated with and/or provided by a wallet provider computer, the authorizing computer 160, the transaction processing computer 150, the transport computer 140, the resource provider computer 130, or any other suitable entity.

The tokenization module 115E-2 may be a module of the digital wallet application 115E-1 or a separate application on the mobile device 120. The tokenization module 115E-2 may comprise code that causes the processor 115A to obtain payment tokens. For example, the tokenization module 115E-2 may contain logic that causes the processor 115A to request a token from the tokenization computer 170 or any other suitable tokenization service provider or system (e.g., the authorizing computer 160 or the transaction processing computer 150). In some embodiments, the mobile device 120 may be able to communicate over-the-air with the tokenization computer 170, and may be able to send a direct request to the tokenization computer 170.

The authentication module 115E-3 may comprise code that causes the processor 115A to conduct an authentication process to authenticate the user 110. The authentication module 115E-3 may include biometric information of the user, secrets of the user, etc., which may be used to authenticate the user 110.

Figure 3:
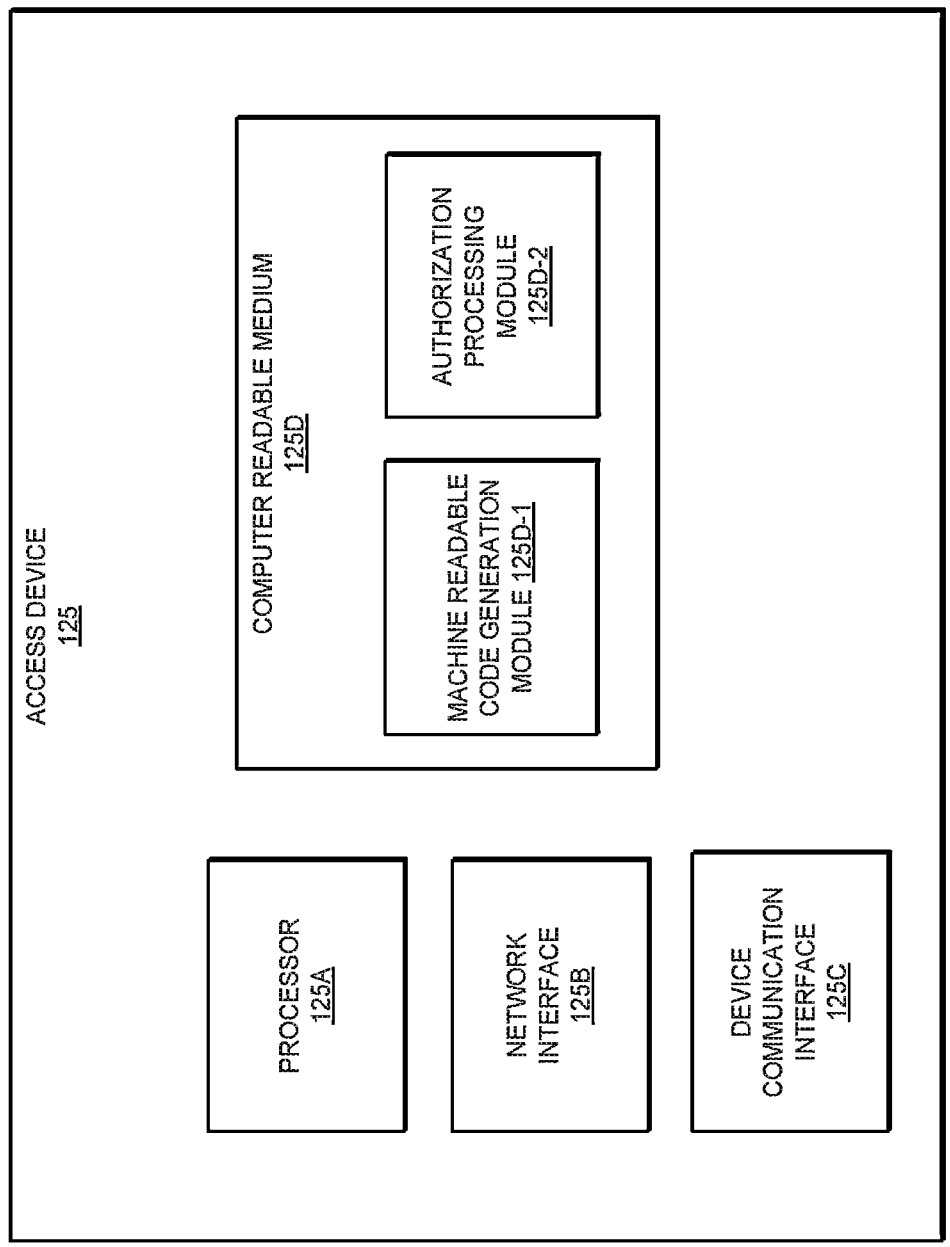
FIG. 3 shows a block diagram of an access device according to an embodiment of the invention.

FIG. 3 shows a detailed block diagram of an access device 125 according to an embodiment of the invention. The access device 125 may comprise a processor 125A operatively coupled to at least a network interface 125B, a device communication interface 125C, and a computer readable medium 125D. The computer readable medium 125D comprises a machine readable code generation module 125D-1 and an authorization processing module 125D-2.

The code generation module 125D-1 may comprise code, which when executed by the processor 125A, may cause the access device 125 to generate a machine readable code, such as a one or two-dimensional bar code.

The authorization processing module 125D-2 may comprise code, which when executed by the processor 125A, may cause the access device 125 to generate authorization request messages, transmit authorization request messages, receive authorization response messages, and process authorization response messages.

The computer readable medium 125D may also comprise code, which when executed by the processor 125A may implement a method comprising providing access device data to a mobile communication device, wherein the mobile communication device generates a token request including the access device data and communication device data and sends the token request to a server computer, which returns a token and a token cryptogram to the mobile communication device; receiving, by the access device, the token and the cryptogram from the mobile communication device; generating, by the access device, an authorization request message; and transmitting, by the access device, the authorization request message to the server computer, wherein the server computer verifies the cryptogram and processes the transaction using the token.

Figure 4:
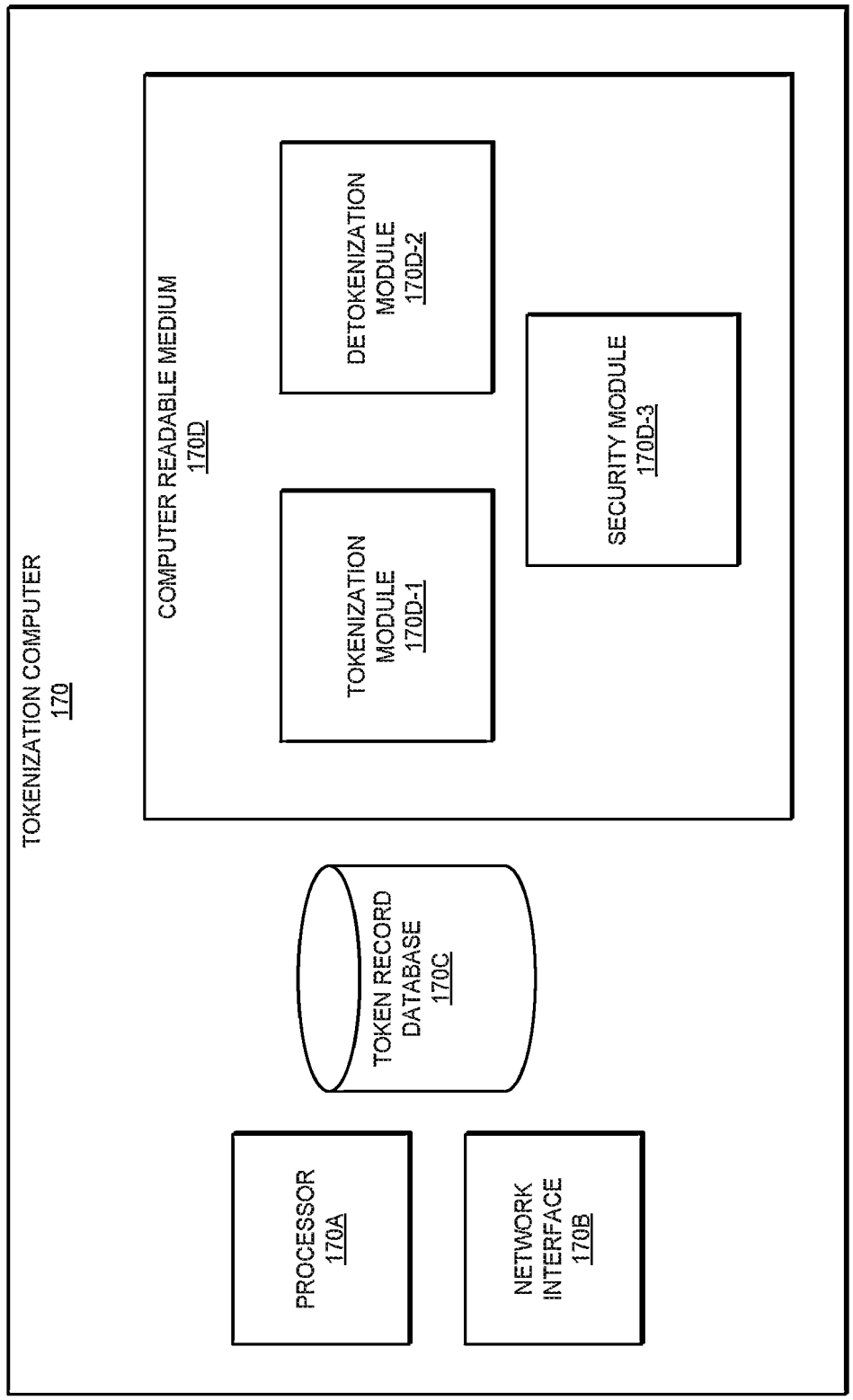
FIG. 4 shows a block diagram of a tokenization computer according to an embodiment of the invention.

FIG. 4 shows a detailed block diagram of a tokenization computer 170 according to an embodiment of the invention. The tokenization computer 170 comprises a processor 170A, a network interface 170B, a token record database 170C, and a computer readable medium 170D.

The computer readable medium 170D may comprise a tokenization module 170D-1, a detokenization module 170D-2, a security module 170D-3, and any other suitable software module.

The tokenization module 170D-1 may comprise code that causes the processor 170A to provide payment tokens. For example, the tokenization module 170D-1 may contain logic that causes the processor 170A to generate a payment token and/or associate the payment token with a set of payment credentials. A token record may then be stored in the token record database 170C indicating that the payment token is associated with a certain user 110 or a certain set of payment credentials.

The detokenization module 170D-2 may comprise code that causes the processor 170A to detokenize payment tokens. For example, the detokenization module 170D-2 may contain logic that causes the processor 170A to identify a token record associated with a payment token in the token record database 170C. A set of payment credentials associated with the payment token (as indicated in the token record) can then be identified.

The security module 170D-3 may comprise code that causes the processor 170A to validate token requests before a payment token is provided. For example, security module 170D-3 may contain logic that causes the processor 170A to confirm that a token request message is authentic by decrypting a cryptogram included in the message, by confirming that the payment credentials are authentic and associated with the requesting user 110, by assessing risk associated with the requesting resource provider computer 130, or by using any other suitable information. If the payment credentials are encrypted, the security module 170D-3 may be able to decrypt the encrypted payment credentials (e.g. via an issuer-specific key or merchant-acquirer encryption models). Also, the security module 170D-3 may include keys and algorithms (e.g., DES, TDES. AES) that can be used with the processor 170A to generate transaction specific cryptograms and decrypt such cryptograms. The security module 170D-3 may also be programmed to cause the processor 170A to distribute keys to other entities that may perform such cryptogram encryption/decryption functions.

A method for performing a transaction can be described with reference to FIGS. 1-4. The transaction that is being performed may be a payment transaction at a resource provider such as a merchant. Initially, the user 110 may select goods or services to purchase at the resource provider.

At step S1, after the goods or services are selected, the access device 125 (e.g, a merchant terminal such as a POS terminal) may generate and display a unique QR code on a display. The QR code may encode transaction-specific information including, but not limited to, access device data such as a merchant identifier, transaction amount, location information (e.g., a GPS location of the access device), transaction timestamp, etc. Other examples of the transaction-specific information may include, but are not limited to, a number of purchases in a past time period, location information of the merchant terminal, an access device ID, a token request timestamp, a mode of QR code scan (e.g., voice or manual), etc.

At step S2, the user may scan the QR code displayed on the access device 125 using his/her mobile device 115. For example, the mobile device 115 may be a smartphone with a camera. The camera may capture the QR code and storage an image of the QR code within memory of the device for further processing. In other embodiments, the access data may be transferred from the access device 125 to the mobile device 115 using a wireless connection such as WiFi, Bluetooth, or NRC, or even a contact mode of interaction.

In some embodiments, the user 110 authenticates to the mobile device 115 before obtaining transaction information (e.g., information encoded in a QR code displayed by an access device) from the access device 125. Alternatively, in some embodiments, the user 110 may use a second device (e.g., a wearable device) communicatively coupled to the mobile device 115 to capture the QR code (e.g., a head mounted display connected to a smartphone device). The user may authenticate to either device by, e.g., issuing a voice command to validate the user with the device (e.g., voice authentication). In some cases, a head mounted device may capture the QR code displayed at the access device 125 (e.g., by using a camera connected to the head mounted device such as Google Glass™). The head mounted device sends the captured QR code information to the mobile device 115. This may be sent over a secure connection supported over a wireless data protocol, such as Bluetooth, Wi-Fi, etc.

In some embodiments, the system may determine whether the transaction amount in the QR code is more than the threshold transaction amount set by the authorizing entity (e.g., an issuer) operating the authorizing computer 160 and/or the user 110. For example, if the transaction amount encoded in the QR code is $500, but the threshold transaction amount is $250, the system (e.g., any of the computers or devices in FIG. 1, such as the combination of the mobile device 115 and the access device 125) may alert the authorizing entity operating the authorizing computer 160, the resource provider operating the resource provider computer 130, and/or the user 110. In this case, further steps may be required to continue with the transaction. For example, if the threshold transaction amount is less than the transaction amount in the QR code, then the user 110 may be prompted by the access device 125 for a challenge PIN code, by communicating with the mobile device 115. In this case, the user 110 may enter the PIN code into the access device 125 to continue with the transaction.

Returning to FIG. 1, at step S3, the mobile device 115 may send a token request message to the tokenization computer 170, which may be in or itself be a cloud based network. Prior to or concurrently with sending the token request message, the mobile device 115 may authenticate with the tokenization computer 170 using, for example, user credentials, a mobile device ID or any other suitable information.

The token request message may request a token and may include the transaction-specific information described above. For example, the token request may include a merchant ID, a transaction amount, location information of the user 110 and/or the resource provider operating the resource provider computer 130, a token request timestamp, and a resource provider (e.g., merchant) initiate timestamp. In some embodiments, the mobile device 115 may send communication device data including transaction information, GPS information, timestamps, a transaction count, a merchant ID, and any user authentication methods to the tokenization computer 170. In some embodiments, the mobile device 115 may encrypt the above information prior to sending it to the tokenization computer 170. The information may be encrypted in a manner such that it can be only be decrypted by the tokenization computer 170.

At step S4, upon receiving the token request message and transaction-specific information from the mobile device 115, the tokenization computer 170 may generate a token for the mobile device 115, a token expiration date, and a transaction cryptogram. Appropriate encryption keys and known algorithms such as AES, TOES, and DES may be used. The transaction cryptogram may include authentication information, which may be derived from at least the transaction-specific information including the merchant ID, the transaction amount, the locations of the user and the merchant, and a time stamp. The token may be associated with a PAN of a payment account belonging to the user 110 of the mobile device 115.

At step S5, the tokenization computer 170 may transmit the generated token and cryptogram in a token response message to the mobile device 115. The generation of the token and cryptogram may be conditional upon authentication of the mobile device 115 and the user 110 by the tokenization computer 170. In some embodiments, the token and cryptogram may be sent to the mobile device 115 using ISO 8583 fields.

In some embodiments, the tokenization computer 170 may return a token provisioned for the mobile device 115 and a uniquely generated cryptogram to be used for validation and token assurance. The following information may be sent to the mobile device 115 and then to the access device 125 according and conforming to ISO 8583 fields: the token, token expiration data, and the uniquely generated cryptogram (e.g., the token cryptogram). The token cryptogram may include the following information: a user's (e.g., device's) GPS location information, a number of purchases in a past time frame (specified by the issuer), a merchant ID, a GPS location of the merchant terminal, transaction initiation timestamp, a transaction amount, token request timestamp, and a mode of QR code scan initiation (e.g., voice initiated, manual screen unlock, manual head mounted display initiation, etc.).

At step S6, after the mobile device 115 receives the token and the cryptogram, the user 110 may interact with the access device 125 using his/her mobile device. For example, the user 110 may tap his/her mobile device 115 to the access device 125 to initiate an NFC connection. In another example, the user 110 may select the access device 125 via the mobile device 115 to establish a short range connection such as a Bluetooth™ connection. In yet another example, the mobile device 115 may generate a unique QR code that encodes the information received from the tokenization computer 170. The QR code may then be scanned by the access device 125.

Regardless of the method of interacting with the access device 125, upon initiating a connection with the access device 125, the access device 125 may receive at least the token, the token expiration date, and the transaction cryptogram from the mobile device 115.

In some embodiments, the user 110 presents the token and the token cryptogram to the access device 125 at the resource provider. The token and token cryptogram may be presented to the access device 125 by, for example, tapping the mobile device 115 on an NFC reader associated with the access device 125. An application running on the mobile device 115 may transmit the token, token expiration date, and the token cryptogram to the access device 125.

In steps S7, S8, and S9, the access device 125 may generate and send an authorization request message to the transaction processing computer 150 via the transport computer 140 and the resource provider computer 130. The authorization request message may also include the token, the token expiration date, and the transaction cryptogram.

At step S10, the transaction processing computer 150 may transmit the authorization request message to the tokenization computer 170 or may provide the token and the token cryptogram to the tokenization computer 170. The transaction processing computer 150 may then decrypt the cryptogram and may also determine the real account identifier from token. Encryption keys and/or lookup tables may be used to perform these functions. For example, a real account identifier may be obtained from a token through a lookup table. In another example, a real account identifier may be mathematically derived from a token.

The tokenization computer 170 may determine a token assurance level based on the transaction-specific information contained within the transaction cryptogram. For example, the token assurance level may be based in part on (i) matching the transaction data in the cryptogram and the authorization request message, (ii) ensuring reasonable proximity of the user 110 and the access device 125 (based on the location information), and/or (iii) determining that a recent transaction count is reasonable. The token assurance level may be based on other transaction-specific information contained within the token cryptogram, as described above. The tokenization computer 170 may compare the transaction-specific information obtained from the decrypted cryptogram with the information in the authorization request message.

The token assurance level may also be based at least in part on identification and verification scoring that can be performed done based on the method used to initiate the QR code scan. For example, if both voice and PIN entry are used, a higher assurance value may be assigned. If only voice/PIN is used, then a medium assurance value may be assigned. If neither voice nor PIN are used, then the issuer can decide the assurance level based solely on the mobile device that is used and any predetermined cloud authentication methods.

In some embodiments, the tokenization computer 170 may also determine if the token is subject to any domain restrictions. For example, as noted above, a single account may have many tokens associated with it. Each token may be used for a different domain. For example, one token associated with an account may be used for e-commerce transactions, while another token associated with the account may be used for in person transactions with a chip card. If the received token is outside of its intended domain, then the transaction can be rejected.

In some embodiments, the tokenization computer 170, the transaction processing computer 150, and/or the authorizing entity (e.g, an issuer) operating the authorizing computer 160 may use the transaction information in the authorization request and match it against the transaction information in the cryptogram. An authorization decision may be made based at least in part on the token assurance level derived from this information. As an illustration, the issuer or the transaction processing computer 150 may verify that the transaction amount and the merchant ID in the authorization request message matches the information derived from the token cryptogram. Additionally, the issuer or the transaction processing computer 150 may ensure that the GPS locations of the user (e.g., device) and the merchant terminal indicate that they are within a reasonable proximity of each other. Further, the issuer or the transaction processing computer 150 may verify that the number of purchases associated with the PAN within a given time frame is reasonable. The issuer or the transaction processing computer 150 may then return an authorization response message to the merchant terminal indicating whether the transaction is approved/rejected.

At step S11, if the tokenization computer 170 verifies the cryptogram, the tokenization computer 170 can return the real account identifier associated with the token to the transaction process computer 150. If the tokenization computer 170 did not modify the authorization request message to include the token, the transaction processing computer 150 may modify the authorization request message to include the token.

At step S12, the transaction processing computer 150 may then transmit the authorization request message to the authorizing computer 160. After receiving the authorization request message, the authorizing computer 160 may then determine if the transaction is authorized. It may do this by determining if there are sufficient funds or credit in the account associated with the account identifier in the authorization request message. It may also conduct any independent fraud screening on the transaction.

At step S13, the authorizing computer 160 may transmit an authorization response message comprising the account identifier back to the transaction processing computer 150. At step S14, the transaction processing computer 150 can then transmit the authorization response message or the information therein to the tokenization computer 170. At step S15, the tokenization computer 170 may then return the authorization response message including the token or the token itself.

If the transaction processing computer 160 only receives the token, it may then modify the authorization response message to include the token and may transmit the authorization response message comprising the token to the transport computer 140 in step S16. In steps S17 and S18, the authorization response message comprising the token is transmitted to the access device 125 via the resource provider computer 130. The resource provider may then store the token instead of the real account identifier. This improves data security, since the token is stored at the resource provider instead of the real account identifier. If the resource provider experiences a data breach and the token is improperly obtained, it is of limited or no use.

At the end of the day or at any other suitable time period, a clearing and settlement process, as is known in the art, may be performed between the transport computer 140, the transaction processing computer 150, and the authorizing computer 160.

Although FIG. 1 shows and describes transaction processing computer 150 that detokenizes a payment token and a transaction cryptogram and that determines a token assurance level, it is understood that these functions could alternatively be performed by other computers including the transport computer 140, the transaction processing computer 150, and/or the authorizing computer 160.

Figure 5:
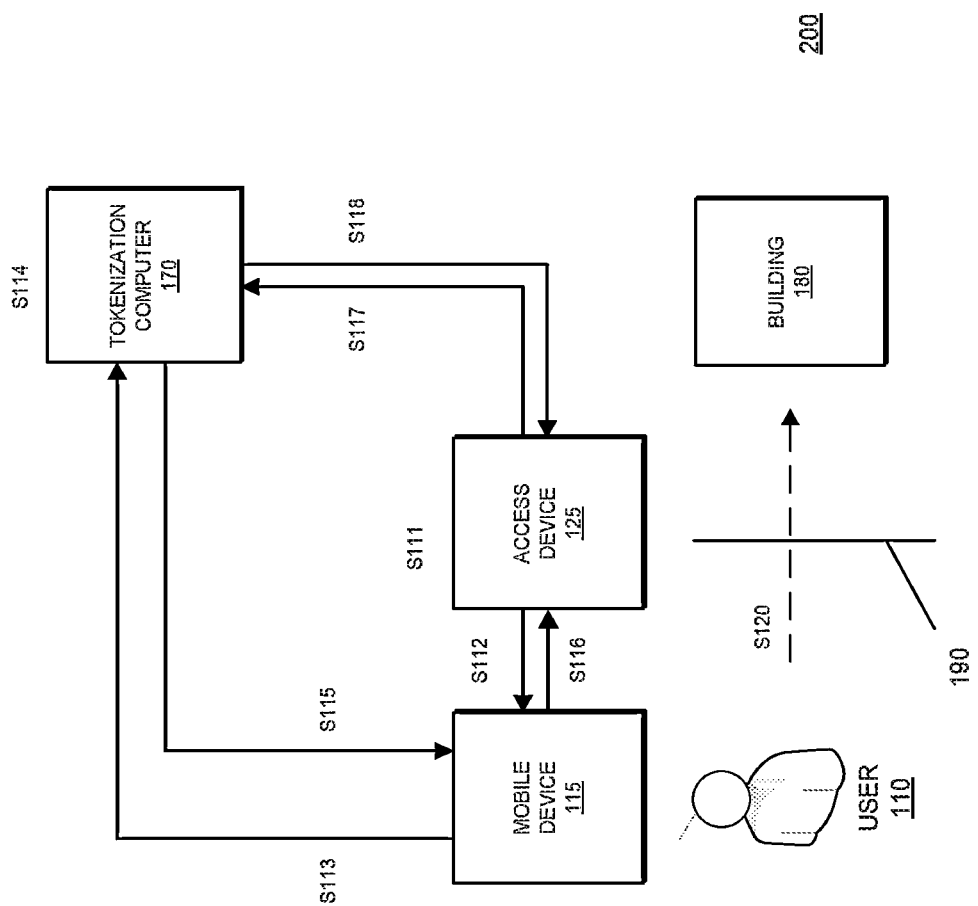
FIG. 5 shows a block diagram of a second transaction system according to embodiments of the invention. Steps in a process flow for a user obtaining access to a building are shown in FIG. 5.

Although the above-described embodiment relates to payments, embodiments of the invention are not limited to payments. FIG. 5 shows a block diagram of a second transaction system according to embodiments of the invention. Steps in a process flow for a user obtaining access to a building are shown are shown in FIG. 5.

In FIG. 5, the mobile device 15, the access device 125, the resource provider computer 130, and the tokenization computer 170 are described above, and the descriptions need not be repeated here. However, FIG. 5 also shows a user 110 that wishes to enter a building 180, where access to the building is restricted by the access device 125.

At step S111, the access device 125 may generate transaction information such as an access device identifier, a transaction request time, and an access device location. This information may be provided to the mobile device 115 in step S112.

At step S113, the mobile device 115 may transmit the information from the access device 125 and information from the mobile device 115 (e.g., the location of the mobile device 115, a mobile device identifier, a real account identifier, a request time, etc.) to the tokenization computer 170.

At step S114, the tokenization computer may then generate a cryptogram and obtain a token for the user 110, and may transmit them back to the mobile device 115 in step S115. Once the mobile device 115 obtains the token and the cryptogram, these may be transmitted to the access device 125 in step S116.

At step S117, the access device 125 may transmit the token and the cryptogram to the tokenization computer 170 and the tokenization computer 170 may determine that the cryptogram and the cryptogram are valid and may provide this indication to the access device 125 (step S118). After the access device 125 receives this information, the user 110 may be allowed to pass into the building 180 as shown in step S120.

A computer system may be used to implement any of the entities or components described above. The subsystems in such a system may be interconnected via a system bus. Additional subsystems include a printer, keyboard, fixed disk, and monitor, which is coupled to display adapter. Peripherals and input/output (I/O) devices, which couple to I/O controller, can be connected to the computer system by any number of means known in the art, such as a serial port. For example, serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

Embodiments of the invention have a number of advantages. For example, by providing a cryptogram with embedded information including data from an access device and a communication device, a token that is used with that cryptogram can be verified for its authenticity. Further, because the cryptogram is created using transaction data, the characteristics of the transaction can be verified to ensure that the transaction characteristics were not tampered with by a resource provider.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention any combination of hardware and software.

Any of the software components or functions described herein may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

What is claimed is:

1. A computer-implemented method comprising:
  receiving, by a mobile communication device from an access device, access device data for conducting a transaction;
  receiving, by a server computer from the mobile communication device for conducting the transaction, a token request, the token request including the access device data associated with the access device and mobile communication device data associated with the mobile communication device, wherein the access device data and the communication device data are specific to the transaction;
  determining, by the server computer, a token and generating, by the server computer, a cryptogram, the cryptogram generated using the access device data and the communication device data;
  transmitting, by the server computer to the mobile communication device, the token and the cryptogram;
  transmitting, by the mobile communication device to the access device, the token and the cryptogram;
  receiving, by the server computer from the access device, the token and the cryptogram;
  decrypting, by of the server computer, the cryptogram;
  determining, by the server computer, a token assurance level based on the access device data and the communication device data in the decrypted cryptogram; and
  based on the token assurance level, transmitting, by the server computer, an authorization response message indicating whether the transaction is approved or rejected.

2. The method of claim 1, wherein:
  the token request further comprises a transaction amount and a token request timestamp;
  the server computer further generates the cryptogram using the transaction amount and the token request timestamp; and
  the server computer further determines the token assurance level using the transaction amount and the token request timestamp.

3. The method of claim 1, wherein the access device data comprises access device location data associated with the access device.

4. The method of claim 1, wherein the communication device data comprises communication device location data determined by the mobile communication device.

5. The method of claim 1, wherein the cryptogram is generated by the server computer based on one or more of: Global Positioning Satellite (GPS) location information of the mobile communication device, a number of purchases in a past time frame, a merchant identifier, a GPS location of the access device, a transaction initiation timestamp, a transaction amount, a token request timestamp, or a mode of Quick Response (QR) code scan initiation.

6. The method of claim 5, further comprising:
  based on the token assurance level, generating, by the server computer, the authorization response message.

7. The method of claim 1, wherein determining the token assurance level comprises one or more of
  determining a proximity between the mobile communication device and the access device based on location information; or
  determining whether the token is subject to any domain restrictions and whether the received token is outside of its intended domain.

8. The method of claim 1, wherein the access device data was scanned by the mobile communication device from a Quick Response (QR) code displayed on the access device.

9. The method of claim 8, wherein determining the token assurance level comprises:
  performing identification and verification scoring based on a method used to initiate the QR code scan.

10. The method of claim 1, wherein the token comprises a series of alphanumeric characters used as a substitute for an account identifier.

11. A system comprising:
  a mobile communication device comprising a processor and a memory including instruction that when executed by the processor performs operation comprising:
    receiving, from an access device, access device data for conducting a transaction;
    transmitting, to the access device, a token and a cryptogram;
  a server computer including a processor; and
    a memory, the memory comprising code, executable by the processor of the server computer, for implementing a method comprising:
      receiving, from the mobile communication device for conducting the transaction, a token request, the token request including the access device data associated with the access device and communication device data associated with the mobile communication device, wherein the access device data and the communication device data are specific to the transaction;
      determining the token and generating the cryptogram, the cryptogram generated using the access device data and the communication device data;
      transmitting, to the mobile communication device, the token and the cryptogram;
      receiving, from the access device, the token and the cryptogram;
      decrypting the cryptogram;
      determining a token assurance level based on the access device data and the communication device data in the decrypted cryptogram; and
      based on the token assurance level, transmitting an authorization response message indicating whether the transaction is approved or rejected.

12. The system of claim 11, wherein:
  the token request further comprises a transaction amount and a token request timestamp;
  the server computer further generates the cryptogram using the transaction amount and the token request timestamp; and the server computer further determines the token assurance level using the transaction amount and the token request timestamp.

13. The system of claim 11, wherein the access device data comprises access device location data associated with the access device.

14. The system of claim 11, wherein the communication device data comprises communication device location data determined by the mobile communication device.

15. The system of claim 11, wherein the cryptogram is generated by the server computer based on one or more of: Global Positioning Satellite (GPS) location information of the mobile communication device, a number of purchases in a past time frame, a merchant identifier, a GPS location of the access device, a transaction initiation timestamp, a transaction amount, a token request timestamp, or a mode of Quick Response (QR) code scan initiation.

16. The system of claim 15, further comprising:
based on the token assurance level, the server computer generating the authorization response message.

17. The system of claim 11, wherein determining the token assurance level comprises one or more of:
determining a proximity between the mobile communication device and the access device based on location information; or
determining whether the token is subject to any domain restrictions and whether the received token is outside of its intended domain.

18. The system of claim 11, wherein:
the access device data was scanned by the mobile communication device from a Quick Response (QR) code displayed on the access device; and
determining the token assurance level comprises performing identification and verification scoring based on a method used to initiate the QR code scan.

* * * * *

UNITED STATES PATENT AND TRADEMARK OFFICE
CERTIFICATE OF CORRECTION

PATENT NO. : 11,943,231 B2
APPLICATION NO. : 17/349727
DATED : March 26, 2024
INVENTOR(S) : Veeresh Kinagi Page 1 of 1

It is certified that error appears in the above-identified patent and that said Letters Patent is hereby corrected as shown below:

In the Claims

In Claim 1, Column 17, Line 42, please delete "by of the" and insert --by the--

Signed and Sealed this
Twenty-third Day of July, 2024

Katherine Kelly Vidal
*Director of the United States Patent and Trademark Office*